(12) United States Patent
Chang et al.

(10) Patent No.: US 9,922,623 B2
(45) Date of Patent: Mar. 20, 2018

(54) EMBOLDENING OF OUTLINE FONTS

(71) Applicant: CANON KABUSHIKI KAISHA, Tokyo (JP)

(72) Inventors: Albert Chang, Lindfield (AU); Michael Gerard McCosker, Ryde (AU)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/970,193

(22) Filed: Dec. 15, 2015

(65) Prior Publication Data

US 2016/0180819 A1 Jun. 23, 2016

(30) Foreign Application Priority Data

Dec. 22, 2014 (AU) .................................. 2014277854

(51) Int. Cl.
*G09G 5/26* (2006.01)
*G06F 17/21* (2006.01)
(52) U.S. Cl.
CPC ............. *G09G 5/26* (2013.01); *G06F 17/214* (2013.01)
(58) Field of Classification Search
None
See application file for complete search history.

(56) References Cited

U.S. PATENT DOCUMENTS

| 5,280,576 | A | | 1/1994 | Cao | |
|---|---|---|---|---|---|
| 5,347,620 | A | * | 9/1994 | Zimmer | G06T 11/001 101/492 |
| 5,852,680 | A | | 12/1998 | Yoshida | |
| 6,498,608 | B1 | | 12/2002 | Dresevic et al. | |
| 6,600,490 | B1 | | 7/2003 | Brock et al. | |
| 2004/0006749 | A1 | * | 1/2004 | Fux | G06F 17/214 715/263 |
| 2013/0335424 | A1 | * | 12/2013 | Wang | G06T 11/203 345/467 |

* cited by examiner

*Primary Examiner* — Ke Xiao
*Assistant Examiner* — Jed-Justin Imperial
(74) *Attorney, Agent, or Firm* — Canon U.S.A., Inc. IP Division

(57) ABSTRACT

Methods, apparatuses, and computer readable storage media for increasing the weight of a character are described. In one aspect, the method includes receiving a vector character description and an emboldening parameter of an initial character. Vertices of an emboldened representation of the initial character are calculated by moving each vertex of the initial character based on a combination of the emboldening parameter and a stroke width for each vertex associated with the vertex, such that each stroke of the emboldened representation of the initial character is thickened based on the width of the stroke. The emboldened representation of the initial character are formed using the calculated vertices to increase the weight of the initial character.

17 Claims, 17 Drawing Sheets

EMBOLDENING OF OUTLINE FONTS

REFERENCE TO RELATED APPLICATION(S)

This application claims the benefit under 35 U.S.C. § 119 of the filing date of Australian Patent Application No. 2014277854, filed Dec. 22, 2014, hereby incorporated by reference in its entirety as if fully set forth herein.

TECHNICAL FIELD

The present invention relates to computer fonts, in particular to emboldening of computer fonts represented in a scalable vector representation of the outline.

BACKGROUND

Fonts used in computers may be represented using a vector description describing the outline of a character shape. Fonts are generally grouped together into a collection of fonts known as a font family. The fonts within the font family are related in their designs but with some variation applied. Example variations that are common include bold, italic and bold italic variations. Typically, each font variation is created by a human font designer and separate font files for each variation are produced. Often, the master font without any variations is the regular font.

Typically when displayed text requires emphasis, a bold font variation is used. A bold font variation often has strokes that are darker when compared to the regular font, often produced by thickening of the strokes. An example of a bold variation is shown in FIGS. 2A and 2B. In FIG. 2A, an uppercase character 'A' is shown for the regular font. FIG. 2B shows the corresponding bold variation, which was created by a human font designer. The right stroke 202 for the bold variant in FIG. 2B is darker than the right stroke 201 for the regular variant in FIG. 2A. The darkening of stroke 202 compared to stroke 201 is produced by thickening of the stroke while the other strokes in the character do not feature significant differences in thickness.

In the absence of a human to create bold variation, automated means of creating bold variations may sometimes be employed. The absence of variations may occur due to various reasons including high cost of human labour to produce, and/or font storage space may be limited. One common method of automated bold variation generation involves thickening of the strokes. One method that provides this effect is the "polygon offset" algorithm. While various implementations of the "polygon offset" algorithm exist, most implementations produce an outline at a specified distance away from the original outline. Shown in FIG. 3 is an example upper-case character 'A', from FIG. 2A, whereby the "polygon offset" has been applied. The character which defines the original outline 301 is filled on the inside 302. To produce the polygon offset path 303, an outline is produced such that each edge is at a fixed distance away from the original path in the outwards direction. When measurements are performed between the original outline and the emboldened outline, such as distances 304, 305 and 306, are of a pre-set distance, and the polygon offset path 303 is oriented a fixed distance away from the original outline 301 on all sides of the character.

The polygon offset method is an efficient algorithm for automated emboldenment but lacks the quality as compared to human generated bold variations. FIGS. 4A and 4B show a comparison of the polygon offset relative to the human designed bold variation. In FIG. 4A a polygon offset path variation is shown, and in FIG. 4B the human font designer generated bold variation is shown. While the thickest stem in the polygon offset method 401 matches the thickness of the human designed bold variation 403, the other strokes have different thicknesses. The thinnest stroke in the polygon offset path 402 has a thickness that is difficult to discern from the boldest 401, and the difference in thickness of the thinnest stroke in the human designed bold variation 404 has a thickness that is distinctly different to that of the thickest 403. The variation of thickness of strokes within a character is often called contrast.

From the comparison illustrated in FIG. 4, it can be seen that the typical automated bold variation generation based on polygon offset does not produce results that mimic that of what a designer intends and makes the font lacking contrast.

SUMMARY

In accordance with an aspect of the invention, there is provided a method of increasing the weight of a character. The method includes: receiving a vector character description and an emboldening parameter of an initial character; calculating vertices of an emboldened representation of the initial character by moving each vertex of the initial character based on a combination of the emboldening parameter and a stroke width for each edge associated with the vertex, such that each stroke of the emboldened representation of the initial character is thickened based on the width of the stroke; and forming the emboldened representation of the initial character using the calculated vertices to increase the weight of the initial character.

The emboldening parameter may be a numeric value, of a data type supporting fractional values and negative values.

The calculating step may include: determining strokes in the vector character description and stroke widths; and calculating directions and distances to transform vertices of a character outline of the vector character description using the determined stroke widths.

The emboldened representation of the initial character may be formed by translating vertices by the calculated direction, calculated distance, and emboldening parameter. Each vertex from the vector character description may be transformed using the calculated distance and direction. The formed emboldened representation of the initial character maintains the contrast of an original outline of the initial character.

For each vertex of a character outline, the distance and direction for translating the vertex may be calculated using the determined stroke widths. Vertices may be extracted from a vectorised form of a character outline.

The method may further include rendering the formed emboldened representation of the initial character using a display or printer device.

In accordance with another aspect of the invention, there is provided a method of increasing the weight of a character, the method including: receiving a vector character description of an initial character; generating a skeleton structure for the vector character description of the initial character; determining vertex transformation vectors using outline control points and the generated skeleton structure; and forming the emboldened representation of the initial character by transforming each vertex using the determined vertex transformation vectors.

Vertex transformation distances and directions of the vertex transformation vectors may be determined using the generated skeleton structure and the original outline.

The generating step may include: identifying strokes in the vector character description; determining control point positions for the strokes of the skeleton structure; and interpolating skeleton positions for non-stroke based features using the determined control point positions of the skeleton structure.

The method may further include rendering the formed emboldened representation of the initial character using a display or printer device.

In accordance with yet another aspect of the invention, there is provided an apparatus for increasing the weight of a character, including: a memory for storing data and a computer program; and a processor unit coupled to the memory for executing a computer program, the memory and the processor configured to interface with a rendering device. The computer program includes: computer program code for receiving a vector character description and an emboldening parameter of an initial character; computer program code for calculating vertices of an emboldened representation of the initial character by moving each vertex of the initial character based on a combination of the emboldening parameter and a stroke width for each edge associated with the vertex, such that each stroke of the emboldened representation of the initial character is thickened based on the width of the stroke; and computer program code for forming the emboldened representation of the initial character using the calculated vertices to increase the weight of the initial character.

The apparatus may further include a display or printer device for rendering the formed emboldened representation of the initial character.

In accordance with still another aspect of the invention, there is provided an apparatus for increasing the weight of a character, including: a memory for storing data and a computer program; and a processor unit coupled to the memory for executing a computer program, the memory and the processor configured to interface with a rendering device. The computer program includes: computer program code for receiving a vector character description of an initial character; computer program code for generating a skeleton structure for the vector character description of the initial character; computer program code for determining vertex transformation vectors using outline control points and the generated skeleton structure; and computer program code for forming the emboldened representation of the initial character by transforming each vertex using the determined vertex transformation vectors.

The apparatus may further include a display or printer device for rendering the formed emboldened representation of the initial character.

In accordance with a further aspect of the invention, there is provided a non-transient computer readable storage medium having recorded therein a computer program for increasing the weight of a character. The computer program includes: computer program code for receiving a vector character description and an emboldening parameter of an initial character; computer program code for calculating vertices of an emboldened representation of the initial character by moving each vertex of the initial character based on a combination of the emboldening parameter and a stroke width for each edge associated with the vertex, such that each stroke of the emboldened representation of the initial character is thickened based on the width of the stroke; and computer program code for forming the emboldened representation of the initial character using the calculated vertices to increase the weight of the initial character.

In accordance with another aspect of the invention, there is provided a non-transitory computer readable storage medium having recorded therein a computer program for increasing the weight of a character. The computer program includes: computer program code for receiving a vector character description of an initial character; computer program code for generating a skeleton structure for the vector character description of the initial character; computer program code for determining vertex transformation vectors using outline control points and the generated skeleton structure; and computer program code for forming the emboldened representation of the initial character by transforming each vertex using the determined vertex transformation vectors.

BRIEF DESCRIPTION OF THE DRAWINGS

At least one embodiment of the invention are described hereinafter with reference to the following drawings, in which.

DETAILED DESCRIPTION

Figure 1A:
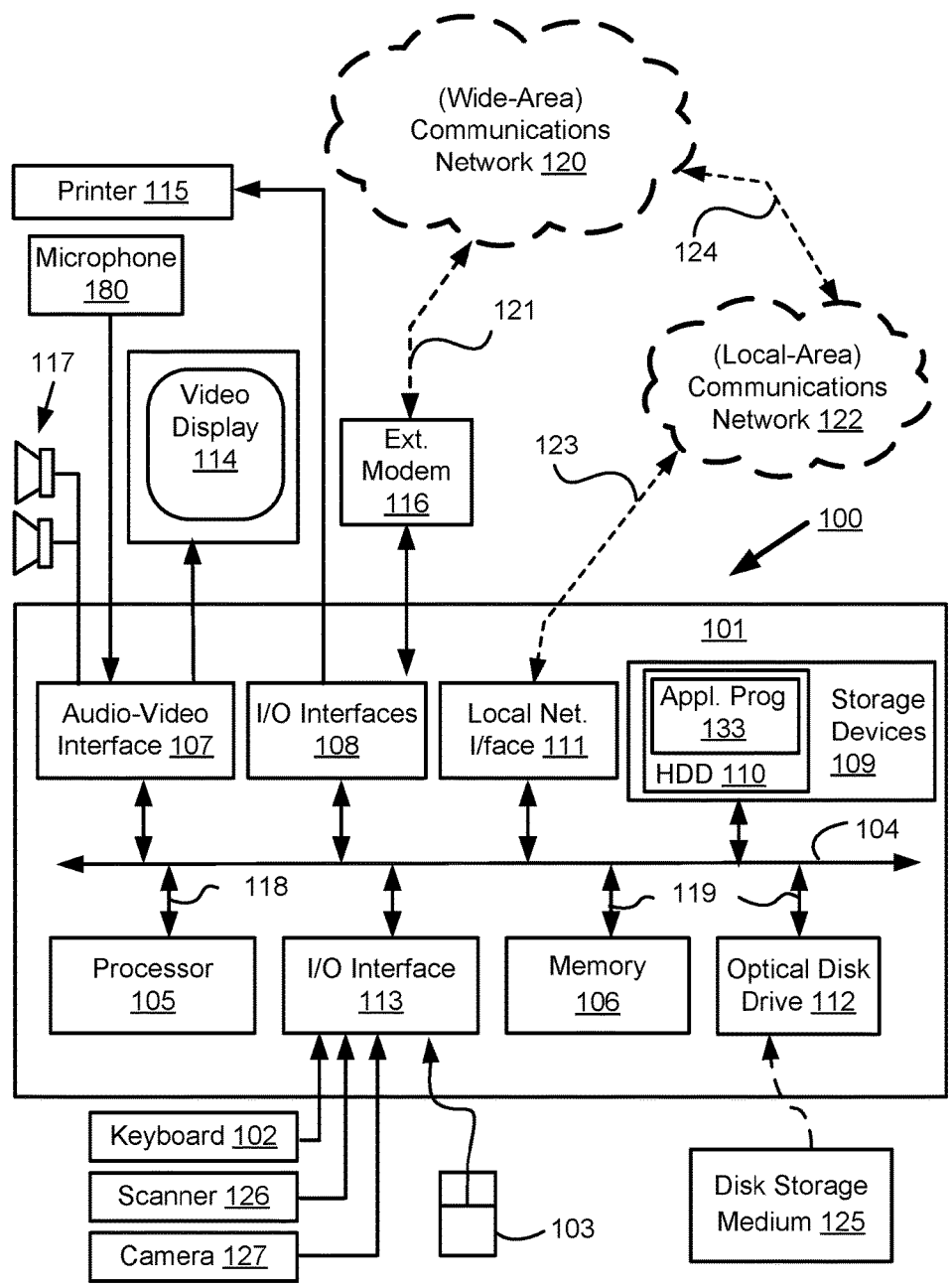
FIGS. 1A and 1B collectively form a schematic block diagram of a general purpose computer with which the described arrangements may be practised.

Methods, apparatuses, and computer readable storage mediums for increasing the weight of a character are disclosed. In the following description, numerous specific details are set forth. However, from this disclosure, it will be apparent to those skilled in the art that modifications and/or substitutions may be made without departing from the scope and spirit of the invention. In other circumstances, specific details may be omitted so as not to obscure the invention.

Where reference is made in any one or more of the accompanying drawings to steps and/or features, which have the same reference numerals, those steps and/or features have for the purposes of this description the same function(s) or operation(s), unless the contrary intention appears.

Context

The embodiments of invention alleviate the problem of decreased contrast when producing bold font variation of a vector based font.

Overview

Figure 5:
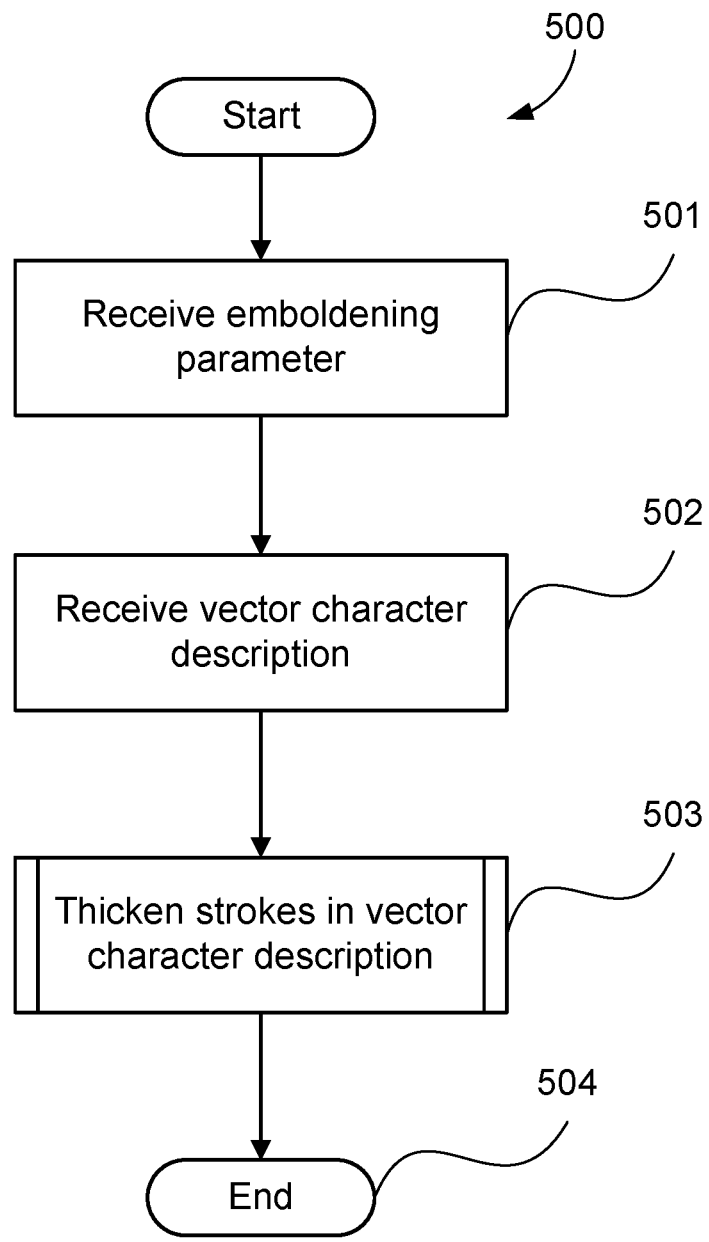
FIG. 5 is a schematic flow diagram illustrating a method for processing a vector based font outline to produce a bold variation.

FIG. 5 is a high-level flowchart of boldening in general. The method 500 for processing of a vector based font outline to produce a bold variation is illustrated. In the method 500, processing commences at step 501, where a font emboldening parameter is received. The font emboldening parameter is used to determine the amount of emboldening to perform—a larger value specifies more stroke thickening and a value of zero specifies no stroke thickening. Continuing onto step 502, a vector character description is received. The vector character description describes the outline of the shape representing the character. Once the definition is retrieved, the definition is subjected to a stroke thickening sub-process at step 503, which results in a vector character description corresponding to a bold variation being produced. As described hereinafter, vertices of an emboldened representation of the initial character are calculated as part of the emboldening. Once the emboldened vector character definition is produced, the process 500 ends at step 504.

Emboldening Parameter—Numeric Value and Supporting Negative

The emboldening parameter is a numeric value, which is used to change the emboldening amount of the algorithm. The emboldening parameter is ideally implemented as a data type supporting fractional values such as 0.5, 1.5, etc. It is within the scope of the embodiments of the invention to support negative emboldening parameter values, which have the effect of lightening the character as opposed to darkening. The lightening of a character corresponds to the thinning of the strokes of a font. A font with thin strokes is often termed as a light font.

Figure 1B:
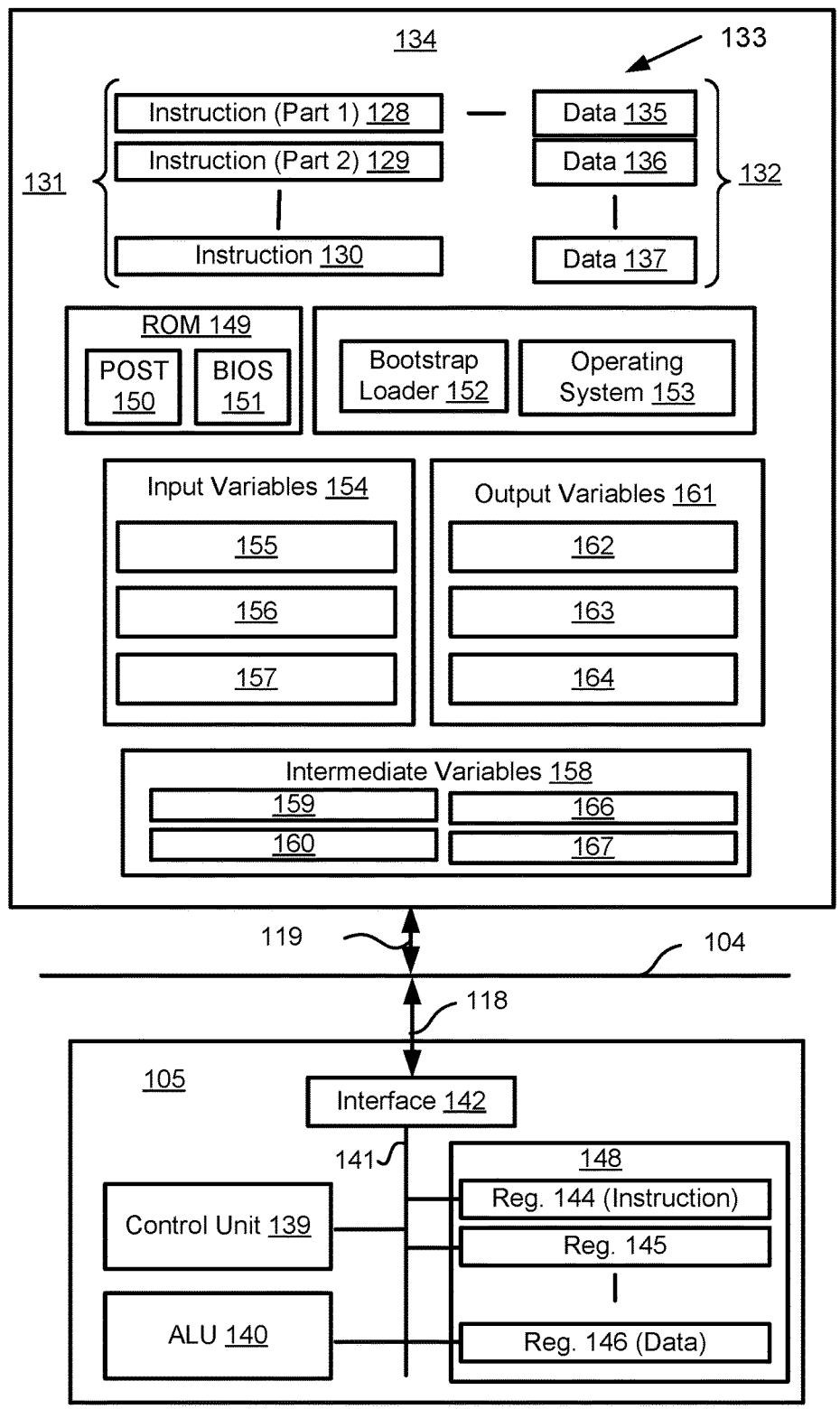
Figure 2A:
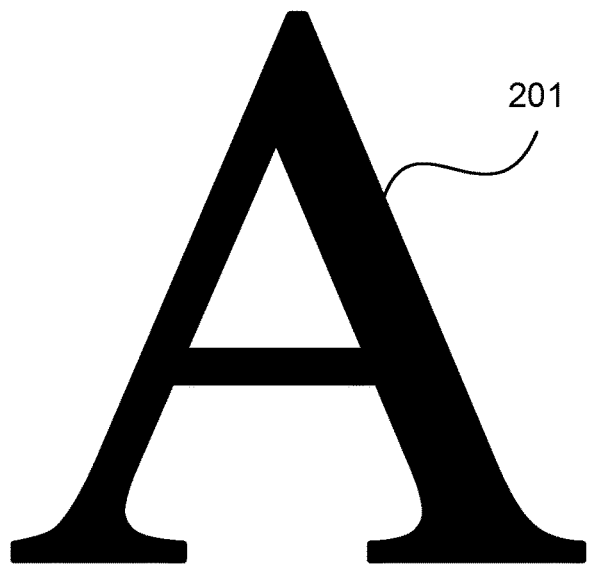
FIGS. 2A and 2B are diagrams illustrating an example character from a regular font and the corresponding bold variation.
Figure 2B:
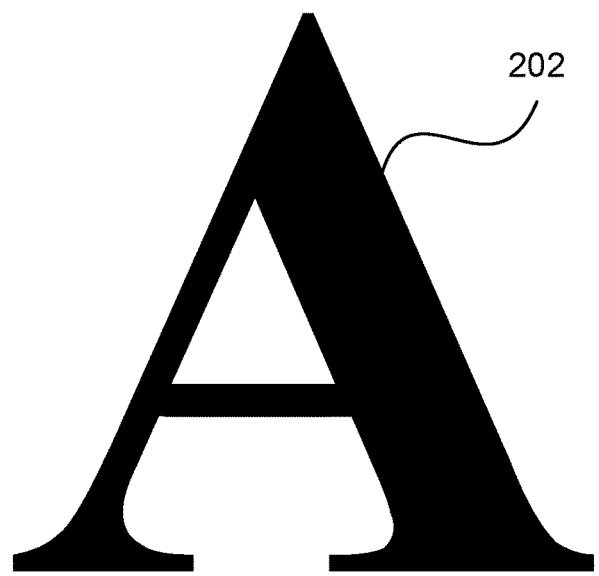

FIGS. 1A and 1B depict a general-purpose computer system 100, upon which the various arrangements described can be practiced.

As seen in FIG. 1A, the computer system 100 includes: a computer module 101; input devices such as a keyboard 102, a mouse pointer device 103, a scanner 126, a camera 127, and a microphone 180; and output devices including a printer 115, a display device 114 and loudspeakers 117. An external Modulator-Demodulator (Modem) transceiver device 116 may be used by the computer module 101 for communicating to and from a communications network 120 via a connection 121. The communications network 120 may be a wide-area network (WAN), such as the Internet, a cellular telecommunications network, or a private WAN. Where the connection 121 is a telephone line, the modem 116 may be a traditional "dial-up" modem. Alternatively, where the connection 121 is a high capacity (e.g., cable) connection, the modem 116 may be a broadband modem. A wireless modem may also be used for wireless connection to the communications network 120.

The computer module 101 typically includes at least one processor unit 105, and a memory unit 106. For example, the memory unit 106 may have semiconductor random access memory (RAM) and semiconductor read only memory (ROM). The computer module 101 also includes an number of input/output (I/O) interfaces including: an audio-video interface 107 that couples to the video display 114, loudspeakers 117 and microphone 180; an I/O interface 113 that couples to the keyboard 102, mouse 103, scanner 126, camera 127 and optionally a joystick or other human interface device (not illustrated); and an interface 108 for the external modem 116 and printer 115. In some implementations, the modem 116 may be incorporated within the computer module 101, for example within the interface 108. The computer module 101 also has a local network interface 111, which permits coupling of the computer system 100 via a connection 123 to a local-area communications network 122, known as a Local Area Network (LAN). As illustrated in FIG. 1A, the local communications network 122 may also couple to the wide network 120 via a connection 124, which would typically include a so-called "firewall" device or device of similar functionality. The local network interface 111 may comprise an Ethernet circuit card, a Bluetooth™ wireless arrangement or an IEEE 802.11 wireless arrangement; however, numerous other types of interfaces may be practiced for the interface 111.

The I/O interfaces 108 and 113 may afford either or both of serial and parallel connectivity, the former typically being implemented according to the Universal Serial Bus (USB) standards and having corresponding USB connectors (not illustrated). Storage devices 109 are provided and typically include a hard disk drive (HDD) 110. Other storage devices such as a floppy disk drive and a magnetic tape drive (not illustrated) may also be used. An optical disk drive 112 is typically provided to act as a non-volatile source of data. Portable memory devices, such optical disks (e.g., CD-ROM, DVD, Blu-ray Disc™), USB-RAM, portable, external hard drives, and floppy disks, for example, may be used as appropriate sources of data to the system 100.

The components 105 to 113 of the computer module 101 typically communicate via an interconnected bus 104 and in a manner that results in a conventional mode of operation of the computer system 100 known to those in the relevant art. For example, the processor 105 is coupled to the system bus 104 using a connection 118. Likewise, the memory 106 and optical disk drive 112 are coupled to the system bus 104 by connections 119. Examples of computers on which the described arrangements can be practised include IBM-PC's and compatibles, Sun Sparcstations, Apple Mac™ or a like computer systems.

The methods of increasing the weight of a character may be implemented using the computer system 100 wherein the processes of FIGS. 5, 6, 12, and 14 may be implemented as one or more software application programs 133 executable within the computer system 100. In particular, the steps of the communication determining methods are effected by instructions 131 (see FIG. 1B) in the software 133 that are carried out within the computer system 100. The software instructions 131 may be formed as one or more code modules, each for performing one or more particular tasks. The software may also be divided into two separate parts, in which a first part and the corresponding code modules performs the determining methods and a second part and the corresponding code modules manage a user interface between the first part and the user.

The software may be stored in a computer readable medium, including the storage devices described below, for example. The software is loaded into the computer system 100 from the computer readable medium, and then executed by the computer system 100. A computer readable medium having such software or computer program recorded on the computer readable medium is a computer program product. The use of the computer program product in the computer system 100 preferably effects an advantageous apparatus for increasing the weight of a character.

The software 133 is typically stored in the HDD 110 or the memory 106. The software is loaded into the computer system 100 from a computer readable medium, and executed by the computer system 100. Thus, for example, the software 133 may be stored on an optically readable disk storage medium (e.g., CD-ROM) 125 that is read by the optical disk drive 112. A computer readable medium having such software or computer program recorded on it is a computer program product. The use of the computer program product in the computer system 100 preferably effects an apparatus for increasing the weight of a character.

In some instances, the application programs 133 may be supplied to the user encoded on one or more CD-ROMs 125 and read via the corresponding drive 112, or alternatively may be read by the user from the networks 120 or 122. Still further, the software can also be loaded into the computer system 100 from other computer readable media. Computer readable storage media refers to any non-transitory tangible storage medium that provides recorded instructions and/or data to the computer system 100 for execution and/or processing. Examples of such storage media include floppy disks, magnetic tape, CD-ROM, DVD, Blu-ray Disc™, a hard disk drive, a ROM or integrated circuit, USB memory, a magneto-optical disk, or a computer readable card such as a PCMCIA card and the like, whether or not such devices are internal or external of the computer module 101. Examples of transitory or non-tangible computer readable transmission media that may also participate in the provision of software, application programs, instructions and/or data to the computer module 101 include radio or infra-red transmission channels as well as a network connection to another computer or networked device, and the Internet or Intranets including e-mail transmissions and information recorded on Websites and the like.

The second part of the application programs 133 and the corresponding code modules mentioned above may be executed to implement one or more graphical user interfaces (GUIs) to be rendered or otherwise represented upon the display 114. Through manipulation of typically the keyboard 102 and the mouse 103, a user of the computer system 100 and the application may manipulate the interface in a functionally adaptable manner to provide controlling commands and/or input to the applications associated with the GUI(s). Other forms of functionally adaptable user interfaces may also be implemented, such as an audio interface utilizing speech prompts output via the loudspeakers 117 and user voice commands input via the microphone 180.

FIG. 1B is a detailed schematic block diagram of the processor 105 and a "memory" 134. The memory 134 represents a logical aggregation of all the memory modules (including the HDD 109 and semiconductor memory 106) that can be accessed by the computer module 101 in FIG. 1A.

When the computer module 101 is initially powered up, a power-on self-test (POST) program 150 executes. The POST program 150 is typically stored in a ROM 149 of the semiconductor memory 106 of FIG. 1A. A hardware device such as the ROM 149 storing software is sometimes referred to as firmware. The POST program 150 examines hardware within the computer module 101 to ensure proper functioning and typically checks the processor 105, the memory 134 (109, 106), and a basic input-output systems software (BIOS) module 151, also typically stored in the ROM 149, for correct operation. Once the POST program 150 has run successfully, the BIOS 151 activates the hard disk drive 110 of FIG. 1A. Activation of the hard disk drive 110 causes a bootstrap loader program 152 that is resident on the hard disk drive 110 to execute via the processor 105. This loads an operating system 153 into the RAM memory 106, upon which the operating system 153 commences operation. The operating system 153 is a system level application, executable by the processor 105, to fulfil various high level functions, including processor management, memory management, device management, storage management, software application interface, and generic user interface.

The operating system 153 manages the memory 134 (109, 106) to ensure that each process or application running on the computer module 101 has sufficient memory in which to execute without colliding with memory allocated to another process. Furthermore, the different types of memory available in the system 100 of FIG. 1A must be used properly so that each process can run effectively. Accordingly, the aggregated memory 134 is not intended to illustrate how particular segments of memory are allocated (unless otherwise stated), but rather to provide a general view of the memory accessible by the computer system 100 and how such is used.

As shown in FIG. 1B, the processor 105 includes a number of functional modules including a control unit 139, an arithmetic logic unit (ALU) 140, and a local or internal memory 148, sometimes called a cache memory. The cache memory 148 typically includes a number of storage registers 144-146 in a register section. One or more internal busses 141 functionally interconnect these functional modules. The processor 105 typically also has one or more interfaces 142 for communicating with external devices via the system bus 104, using a connection 118. The memory 134 is coupled to the bus 104 using a connection 119.

The application program 133 includes a sequence of instructions 131 that may include conditional branch and loop instructions. The program 133 may also include data 132 which is used in execution of the program 133. The instructions 131 and the data 132 are stored in memory locations 128, 129, 130 and 135, 136, 137, respectively. Depending upon the relative size of the instructions 131 and the memory locations 128-130, a particular instruction may be stored in a single memory location as depicted by the instruction shown in the memory location 130. Alternately, an instruction may be segmented into a number of parts each of which is stored in a separate memory location, as depicted by the instruction segments shown in the memory locations 128 and 129.

In general, the processor 105 is given a set of instructions which are executed therein. The processor 105 waits for a subsequent input, to which the processor 105 reacts to by executing another set of instructions. Each input may be provided from one or more of a number of sources, including data generated by one or more of the input devices 102, 103, data received from an external source across one of the networks 120, 122, data retrieved from one of the storage devices 106, 109 or data retrieved from a storage medium 125 inserted into the corresponding reader 112, all depicted in FIG. 1A. The execution of a set of the instructions may in some cases result in output of data. Execution may also involve storing data or variables to the memory 134.

The disclosed communications determining arrangements use input variables 154, which are stored in the memory 134 in corresponding memory locations 155, 156, 157. The arrangements produce output variables 161, which are stored in the memory 134 in corresponding memory locations 162, 163, 164. Intermediate variables 158 may be stored in memory locations 159, 160, 166 and 167.

Referring to the processor 105 of FIG. 1B, the registers 144, 145, 146, the arithmetic logic unit (ALU) 140, and the control unit 139 work together to perform sequences of micro-operations needed to perform "fetch, decode, and execute" cycles for every instruction in the instruction set making up the program 133. Each fetch, decode, and execute cycle comprises:

(i) a fetch operation, which fetches or reads an instruction 131 from a memory location 128, 129, 130;

(ii) a decode operation in which the control unit 139 determines which instruction has been fetched; and (iii) an execute operation in which the control unit 139 and/or the ALU 140 execute the instruction.

Thereafter, a further fetch, decode, and execute cycle for the next instruction may be executed. Similarly, a store cycle may be performed by which the control unit 139 stores or writes a value to a memory location 132.

Each step or sub-process in the processes of FIGS. 5, 6, 12, and 14 is associated with one or more segments of the program 133 and is performed by the register section 144, 145, 146, the ALU 140, and the control unit 139 in the processor 105 working together to perform the fetch, decode, and execute cycles for every instruction in the instruction set for the noted segments of the program 133.

An apparatus for increasing the weight of a character can be implemented using the computer system 100.

Embodiment 1

Boldening with Stroke Widths

Figure 6:
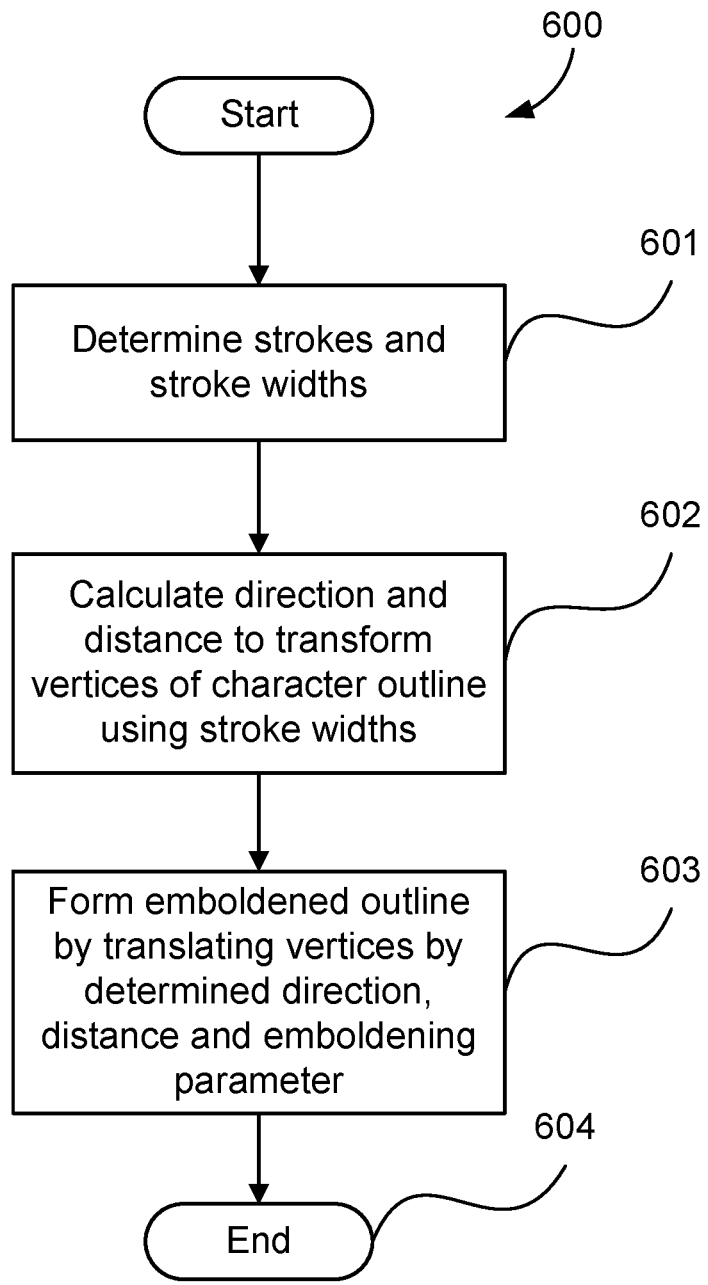
FIG. 6 is a schematic flow diagram illustrating a method for the stroke thickening sub-process.

Shown in FIG. 6 is a flowchart of a method 600 for the stroke thickening sub-process, corresponding to an embodiment of the sub-process described at step 503 of FIG. 5. The method 600 starts by determining the strokes in the character definition and the stroke widths at step 601. In step 602, the direction and distance to transform vertices of character outline are calculated using stroke widths. For each vertex of the character outline, the translation distance and translation direction are determined using the determined stroke widths. The vertices typically correspond to the control points defining the outline. Vertices may also be extracted from the vectorised form of the outline—in this case the vertices correspond to the joining of the adjacent edges. At step 603, the emboldened outline is formed by translating vertices by the determined direction, distance, and emboldening parameter. Each vertex from the vector character description is transformed using the calculated translation distance and translation direction from step 602. Once this is complete, at step 604 an emboldened font outline is produced that maintains contrast. The process 600 terminates.

Determining Stroke Thickness

Figure 7:
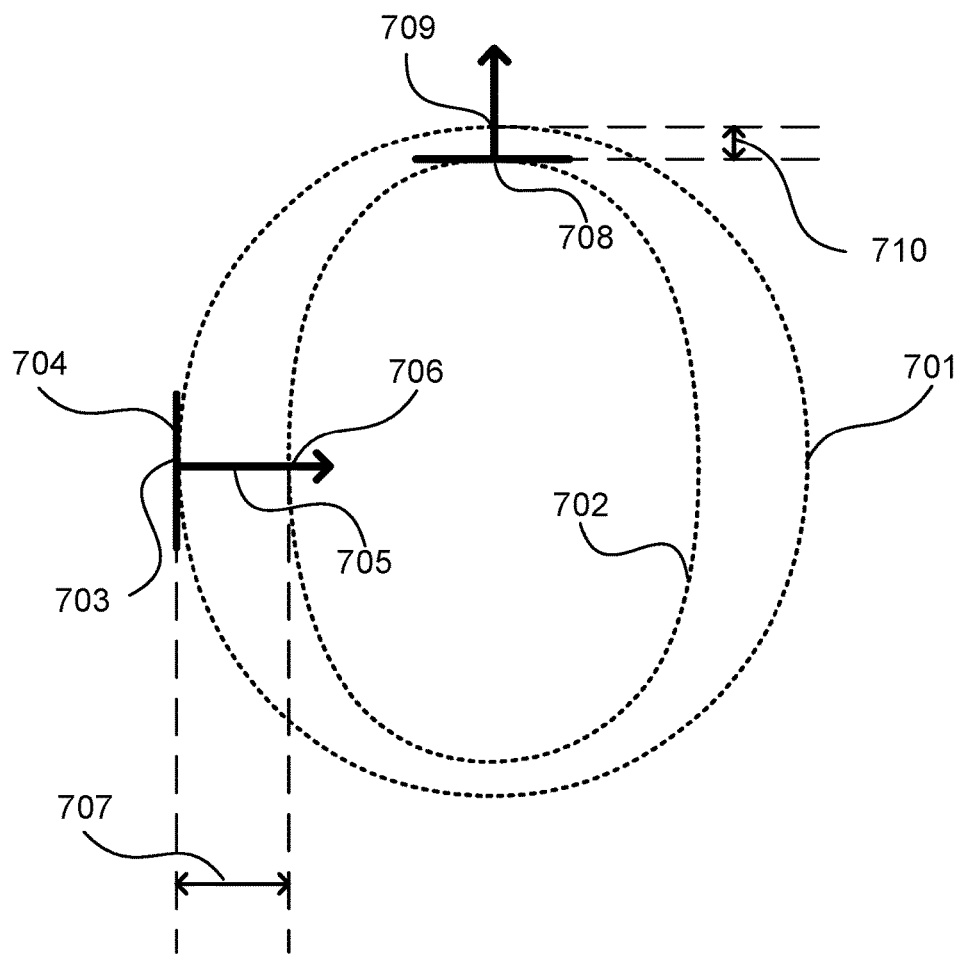
FIG. 7 a block diagram illustrating the stroke width measurement in the context of an example character.

Shown in FIG. 7 is an illustration of an example of determining (measuring) stroke widths. Using the example illustrated in FIG. 7, the steps of stroke width measurement corresponding to step 601 is described in greater detail. FIG. 7 shows an example character 'O ', and two points on the outer outline of the character whereby measurements are performed. The character is defined by two curves—an outer curve 701 and an inner curve 702 (shown with dotted lines). An example stroke width measurement point 703 located on the left side of the outer curve 702 is described. The stroke width is measured at a point 703, where the tangent 704 at that point is determined. A line 705 is projected from the point 703 in a direction that is orthogonal to the tangent 704—this direction is said to be in the normal direction. The point of intersection 706 of projected line 705 and the inner curve 702 is used to measure the width of the stroke 707. Similarly for a point 708 located at the top of the inner outline 702, which produces a normal projected line to intersect the outer outline at point 709 produces a measured width of 710.

The direction of the width measurement step depends on the winding count of the curves defining the outline. In the example character shown in FIG. 7, one possible ordering of the control points for the outer curve 701 would be defined in a clockwise order and the order of the control points for the inner curve 702 would be defined in the opposite order (i.e. anticlockwise order). By examining the winding counts, the filled region of the character may be determined, which in turn is useful to the determining the direction of a curve to perform the width measurement.

Calculating Distance and Direction of Projection for Bold

Figure 8:
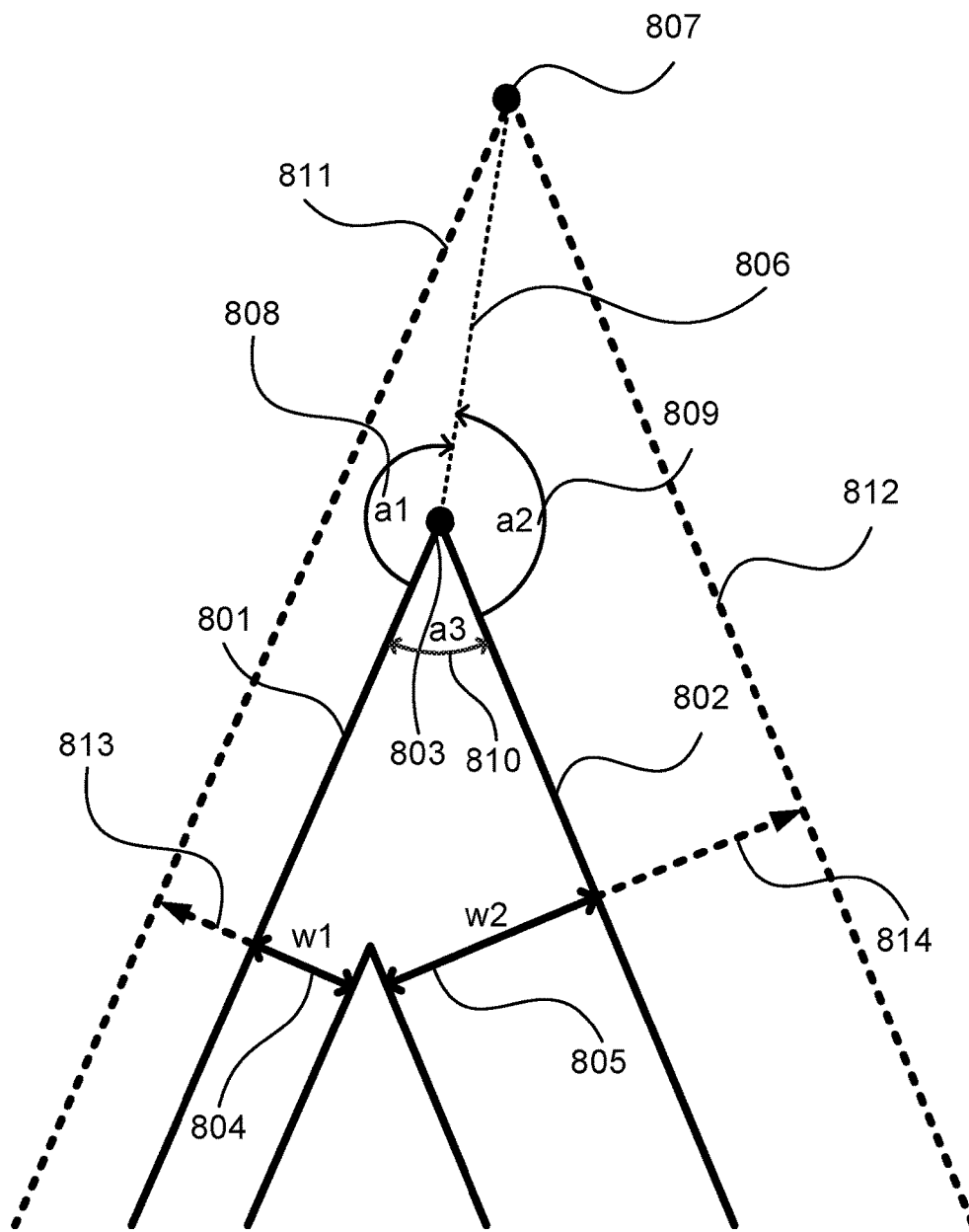
FIG. 8 a block diagram illustrating the relationship between the stroke widths of the edges with the angle of projection and the distance of projection for the emboldened vertex.

FIG. 8 illustrates the relationship of the stroke widths on the angle of projection of the outline vertex to the emboldened vertex. In reference to FIG. 8 an explanation is provided of how the direction and distance of projection is determined (calculated). Shown in the example are two edges 801 and 802 meeting at a vertex point 803. The measurement of the widths of the strokes corresponding to edges 801 and 802 produce distance values corresponding to 804 for edge 801 and 805 for edge 802. The width for 804 is denoted as w1 and the width for 805 is denoted as w2. As the width measurements are scalar values, the values for w1 and w2 are also scalar. The projection line 806 from the original vertex 803 to the final emboldened vertex position 807 forms an angle 808 a1 relative to edge 801 and forms an angle 809 a2 relative to 802. A third angle, corresponding to the angle between the edges 801 and 802 is also denoted as a3 810 such that the sum of the angles is equal to $2\pi$ radians (i.e. a1+a2+a3=$2\pi$). It can be determined that the relationship between the angles a1 and a2 with the stroke widths w1 and w2 is:

$$\frac{w1}{w2} = \frac{\sin(a1)}{\sin(a2)}$$

Given the relationship between the widths and the angles, and given that the angle a3 810 is a measurable quantity, then the value for a1 can be determined using the following expression:

$$\tan(a1) = \frac{-w1\sin(a3)}{w1\cos(a3) + w2}$$

Once the value a1 is determined, the value for a2 may be similarly determined using a similar formula, or by using the ratios between the stroke widths and the sine of the angles. The calculation of the projection direction of the vertex may also be representable by a formula which is dependent only on the angle a3 810 and the measured stroke widths w1 804 and w2 805. Once the angle a1 and a2 are known, the projection distance may be determined by using the following expression:

$$d = \frac{w1}{\sin(a1)} = \frac{w2}{\sin(a2)}$$

As the parameters w1 and w2 are values that are independent of the emboldening parameter, which is denoted as k, the final transformation distance required is k×d. The resultant calculations results in emboldened edges 811 and 812 to be formed, such that edge 811 is oriented a distance k×w1 (shown as 813) away from edge 801 and edge 812 is oriented a distance k×w2 (shown as 814) away from edge 802. The two newly formed edges 811 and 812 intersect at the emboldened vertex position 807.

Translating Vertices

Once the projection direction and distance values are determined, the vertices in the original outline are translated. The translations modify the points such that the point is oriented at angle a1 808 from the leading edge 801 and at a distance k×d. As the calculations for determining the direction and distance are performed for each vertex, each vertex may produce different directions and distances. Once the translation step has been applied, the transformed edges are orientated at an identical angle to the original edge but are positioned at a distance that is proportional to the width of the stroke for which the edge corresponds to.

Intended Result of Boldening with Different Amounts

Figure 3:
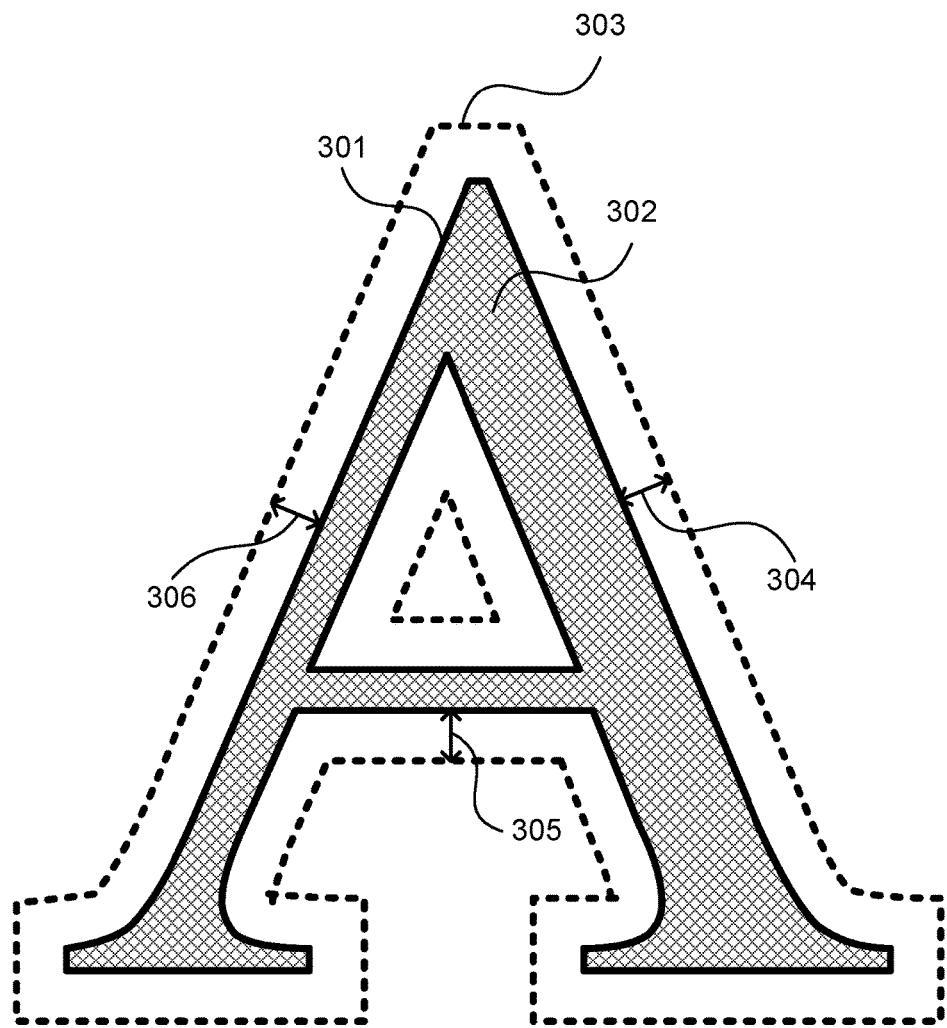
FIG. 3 is a diagram showing an example character using the polygon offset emboldening transformation.
Figure 4A:
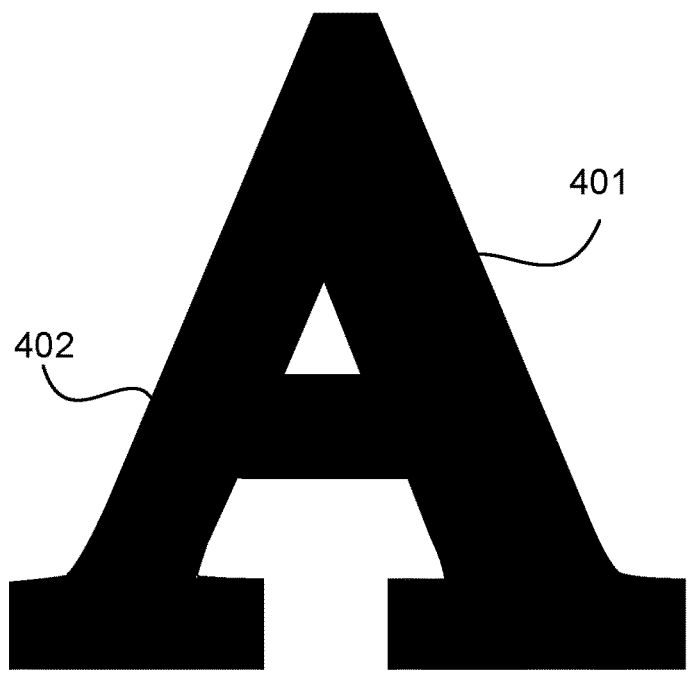
FIGS. 4A and 4B illustrate an example character showing a synthetic font variation result using polygon offset as compared to one produced by a human font designer.
Figure 4B:
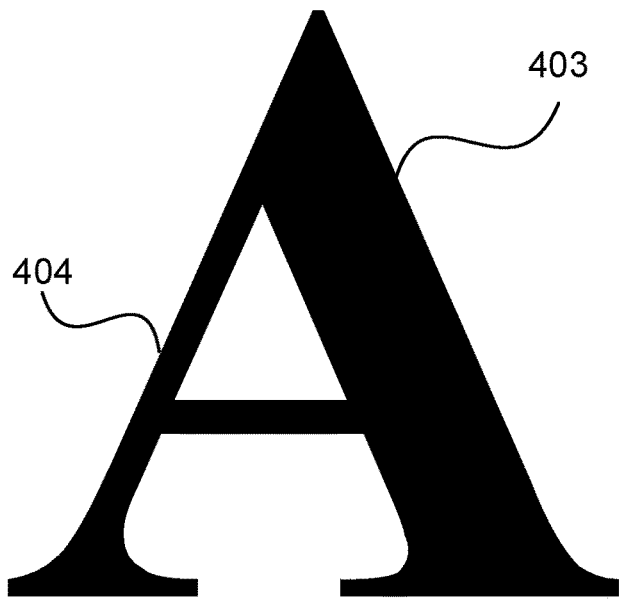
Figure 9:
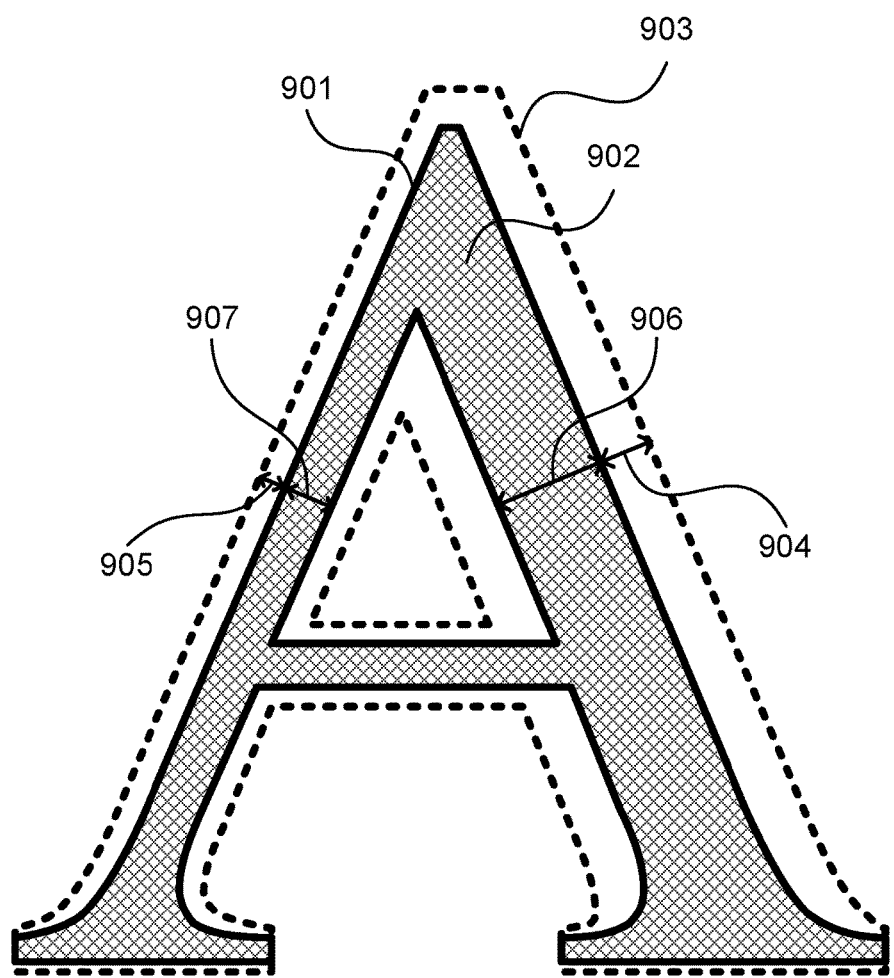
FIG. 9 a block diagram showing the results of emboldening using the proposed method in the context of an example character.

FIG. 9 illustrates an example of an upper case 'A' character demonstrating the application of the disclosed process, which is in contrast to the example shown in FIG. 3. In this example, the original outline 901, which is filled on the inside 902, produces an emboldened outline 903. The measured distance 904 between the original outline 901 and the emboldened outline 902 on the right stroke is similar to that in 304. However, the emboldened distance 905 on the left stroke between the original outline 901 and the emboldened outline 902 is smaller than the measured right measured distance 904. In this example, the ratio between the left emboldened distance 905 and the left stroke width 907 of the left stroke is in the same proportions to that of the right emboldened distance 904 with right stroke width 906, thereby preserving the contrast in the emboldened representation. In comparison to the example of FIG. 3, the offset distance is of a fixed distance and does not consider the width of the stroke or the contrast of the character. The example output in FIG. 9 illustrates a bold variation that maintains the contrast of the original outline. FIG. 9 illustrates the intended result of boldening with different amounts.

Handling of Curves

Typically, the emboldening process is performed on the edges corresponding to vectorised edges, whereby curves are first converted to a series of straight edges approximating the original curve. However, the processing of the character definition in the vectorised form is inefficient as the emboldening process may be performed directly on the control points from the Bezier representation. While this process does not produce the results identical to the vectorised form, the results produced are acceptable while allowing good performance.

Figure 10A:
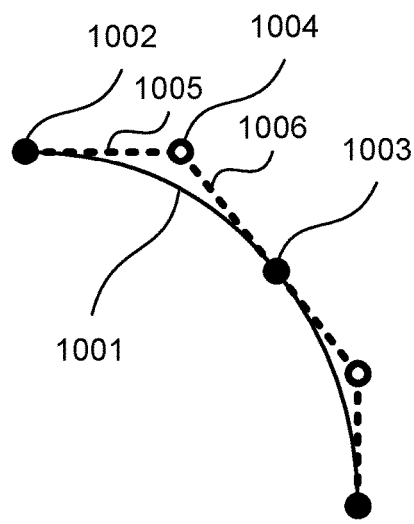
FIGS. 10A, 10B and 10C are block diagrams collectively illustrating the emboldening process for quadratic Bezier curve segments.

FIG. 10 provides an example showing the preferred emboldening process for quadratic Bezier curve segments. FIG. 10A shows an example quadratic Bezier curve segment, where the curve 1001 passes through the on-curve control points 1002 and 1003, and the curvature is modified by the off-curve control point 1004. Rather than vectorising the curves, for the process of emboldening line segments are considered between the control points. In the example, an edge 1005 is then formed between control on-curve control point 1002 and off-curve control point 1004 and an edge 1006 is formed between off-curve control point 1004 and on-curve control point 1003. Then the processing of the emboldening removes the distinction between off-curve and on-curve control points and the processing is performed using the newly formed edges (for example, 1005 and 1006).

Figures 10B, 10C:
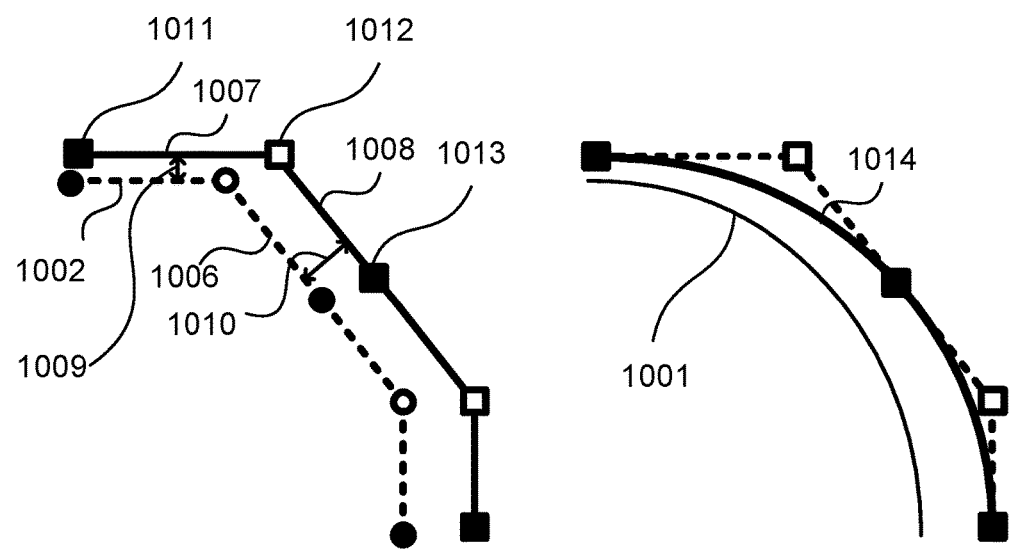

FIG. 10B illustrates the example emboldening on control points corresponding to a curve segment, which has been converted to straight edges. By connecting the on-curve and off-curve control points with edges and then performing emboldening on the newly formed edges, the emboldened edges 1007 and 1008 are produced, whereby edge 1007 is offset a distance 1009 from edge 1005 and edge 1008 is offset a distance 1010 from edge 1006. The process of positioning the edges are performed by producing the points 1011, 1012 and 1013 which place the edges 1007 and 1008 at the distances corresponding to the stroke widths associated with the edges.

FIG. 10C shows the process of converting the control points back to Bezier curve segments. Once the emboldened control points are derived, the edges 1007 and 1008 are removed and the curve 1014 is inserted such that curve 1014 passes through the on-curve control points 1011 and 1013 and the curvature is influence by off-curve control point 1012. The original curve the original curve 1001 is shown and the generated emboldened curve 1014 is shown with varying distance between the curve. The emboldening on the straight edges in place of curves produces a result which produces suitable results.

It should be noted that while the description for emboldening for curves segments mentions the insertion of straight edges in place of curve segments, and then the removal of the inserted straight edges and converting back to curve segments, the process may be applied implicitly to all control points, assuming all control points are specified in a sequence and the sequence of control points are connected by edges. As the emboldening process does not modify the number or order of control points, the emboldened control points can then be converted back to curve segments. This allows for efficient processing as unnecessary steps are omitted thereby improving performance and lowering memory requirements.

Handling of Stroke Ends

For stroke-based features of a glyph, a measurable stroke width should be present. However, certain features of a glyph may not correspond to stroke features. An example of a feature where the stroke width cannot be determined are the stroke ends. The stroke ends do not have a measurable "stroke width" as the stroke ends are stroke termination features. When dealing with a stroke termination features, a width value of zero can be assigned to the edges corresponding to the stroke end in order to prevent stroke ends from growing in length.

Figure 11A:
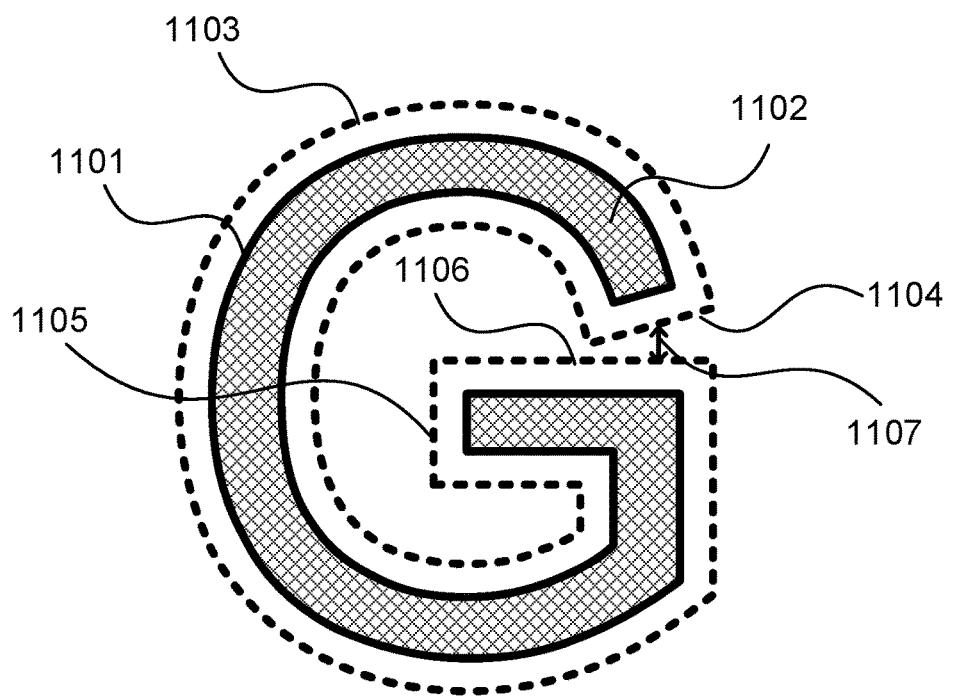
FIGS. 11A and 11B are block diagrams illustrating the behaviour of the proposed method on emboldening of stroke ends.
Figure 11B:
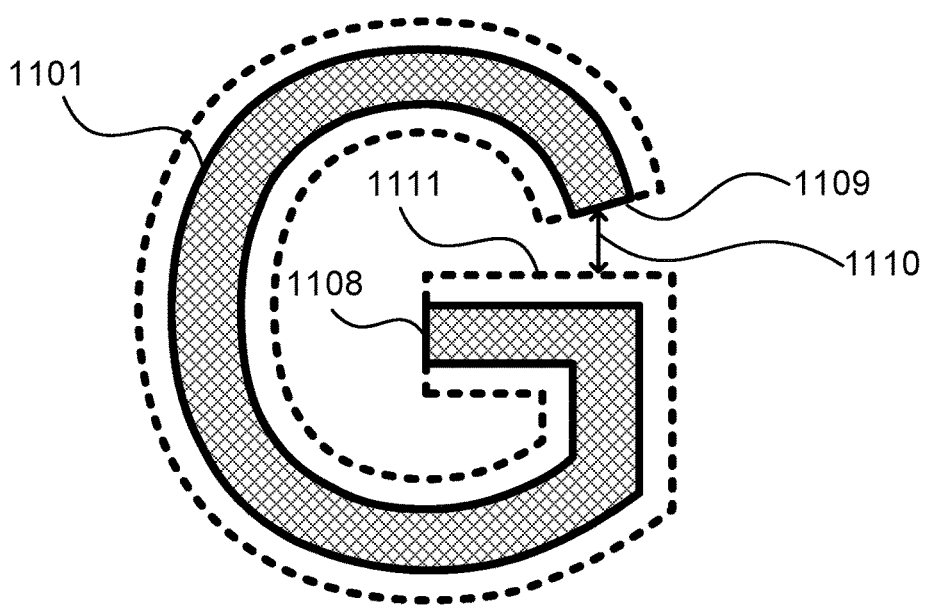

FIG. 11 shows an example of the emboldening processing for stroke ends. FIG. 11A illustrates an example uppercase character 'G' as processed by the polygon offset method. An uppercase character 'G' is defined by an outline 1101 which is subsequently filled inside region 1102. The emboldened outline 1103 features two stroke ends 1104 and 1105 whereby the distance of the stroke end edge are a fixed distance away from the original outline 1101 corresponding to the user specified emboldening amount. As the emboldening amount is increased, the space 1107 between stroke-end 1104 and horizontal stroke edge 1106 can be observed to decrease. When the space 1107 between the stroke end and the edge 1106 disappears, then a stem collision has occurred. Shown in FIG. 11B is an example with no stroke end growth. In this example the uppercase character 'G' features emboldened stroke ends 1108 and 1109 with a zero distance from the original outline 1101. In this example, the space 1110 between the stroke-end 1109 and the stroke edge 1111 is larger than that space 1107 in the polygon offset method. This reduces the prevalence of stem collision from occurring with stroke ends. By minimising stem collisions, the emboldening latitude is increased thereby allowing a larger emboldening parameter to be used without collisions.

The adjustments shown in the example in FIG. 11B are implemented by assigning a zero stroke width to the edges at the stroke ends. When an edge has a stroke width of zero, the emboldened edge is positioned at a distance of zero away, thereby preventing the stroke ends from growing in length.

Embodiment 2

Boldening Using Skeleton Structure

Figure 12:
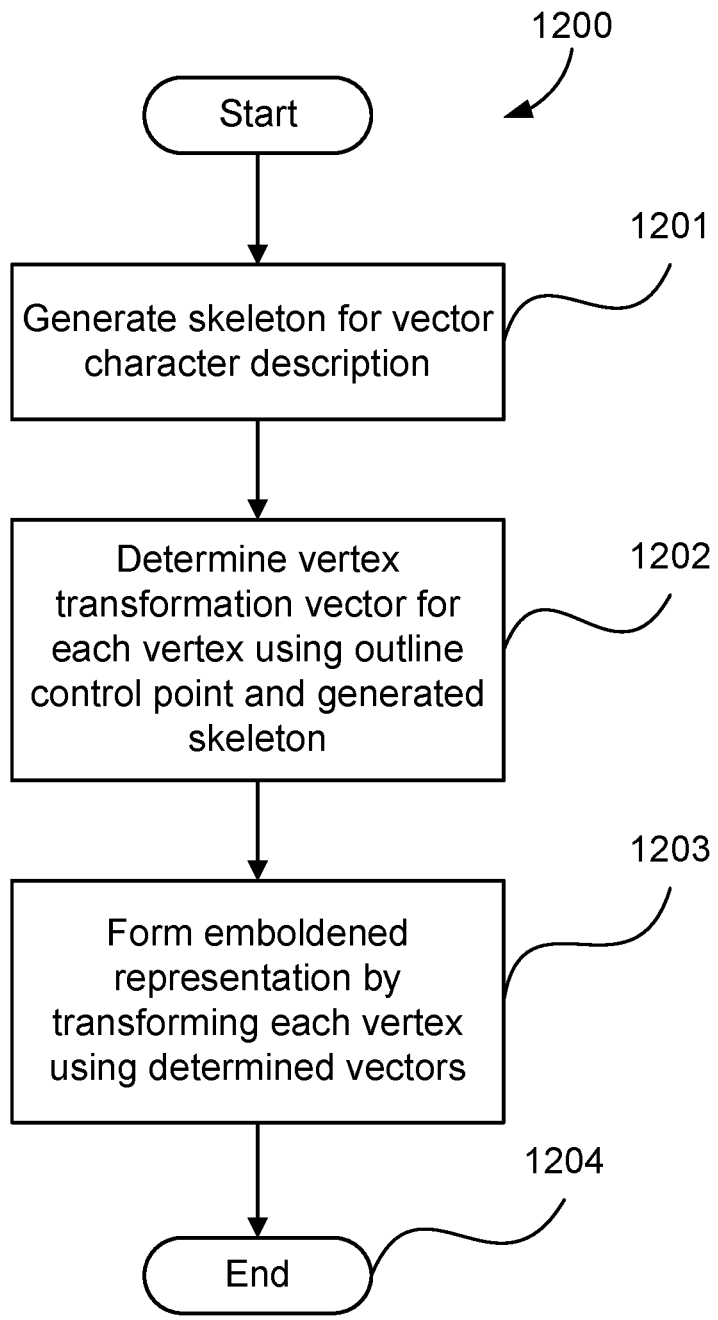
FIG. 12 is a schematic flow diagram illustrating a method for stroke thickening sub-process using a skeleton structure.

FIG. 12 illustrates a method 1200 for stroke thickening using a skeleton structure, which corresponds to sub-process at step 503 described with reference to FIG. 5. The method 1200 begins at step 1201 where a skeleton structure is generated for the vector character description that was received at step 502. At step 1202, the vertex transformation vector is determined for each vertex using outline control point and generated skeleton structure. The vertex transformation distance and direction is determined using the generated skeleton structure and the original outline. At step 1203, the emboldened representation is formed by transforming each vertex using the determined vertex transformation vectors. The vertices of the outline are transformed using the calculated distance and direction for each vertex. The process 1200 is then complete at step 1204 where an emboldened font outline is produced.

It should be noted that using the skeleton structure for emboldening produces a similar result to measuring the stroke widths and using stroke widths for the emboldening steps of stroke edges. As the skeleton structure locates points in the middle of strokes, which are located at half the width of strokes, the projection directions and distances produced are similar. The usage of the skeleton assists in simplifying the calculations for the distance and direction of the projections.

Example Character Outline with Generated Skeleton Structure

Figure 13:
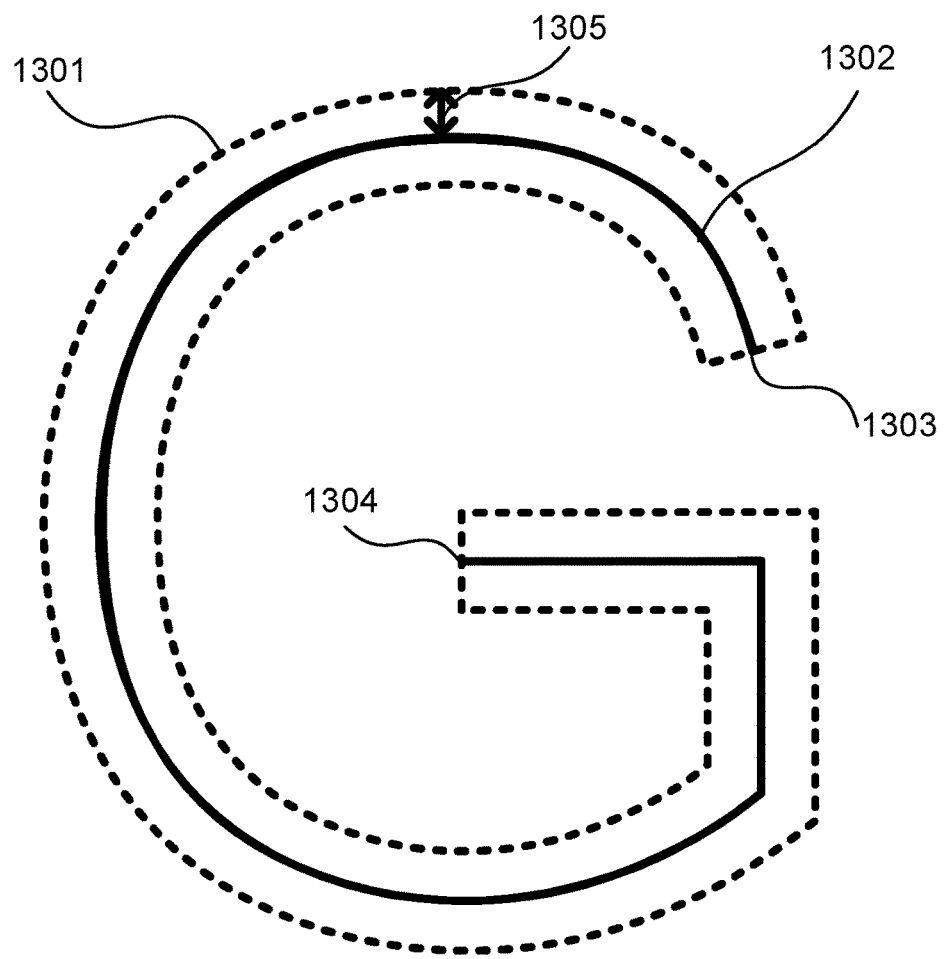
FIG. 13 illustrates an example character and the corresponding generated skeleton.

FIG. 13 illustrates an example of an uppercase 'G' character, showing the outline and the corresponding generated skeleton. The original outline 1301 corresponds to an uppercase 'G' character which is depicted in FIG. 11. The generated skeleton 1302 is located within the middle of the stroke features of the outline and begins at the first stroke end 1303 and ends at the last stroke end 1304. The skeleton is similar in shape to how a human would draw the character using a pen, where the pen is drawn in a midline of the stroke. Once the skeleton is generated, the measurement of the stroke width is performed by measuring the distance between the outline and the skeleton. An example measurement 1305 is shown at the top of the character—the closest distance from the outline to the skeleton is measured which produces the stroke width. Note that the skeleton generation process produces a skeleton that intersects the stroke ends 1303 of the outline. At the intersection points 1303, the distance of the skeleton point to the original outline has a distance of zero, thereby allowing the behaviour of limiting stroke end growth during emboldening as described hereinbefore with reference to FIG. 11.

Skeleton Generation

Figure 14:
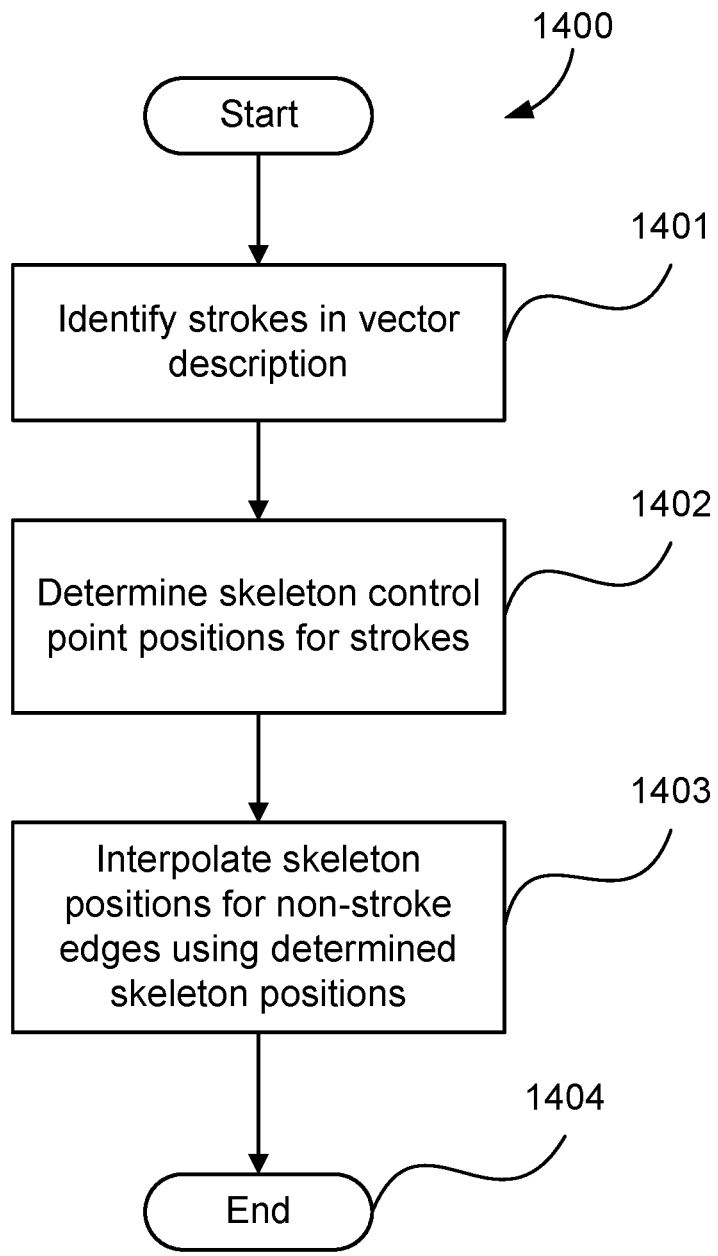
FIG. 14 is a schematic flow diagram illustrating a method for generating a skeleton for a vector character description.

FIG. 14 illustrates a method 1400 for generating a skeleton for a vector character outline description. The method 1400 begins at step 1401 where the strokes in the vector outline description are identified. At step 1402, the skeleton control point positions are determined for the strokes, by calculating the points situated between the two edges defining the stroke. Step 1403 performs interpolation of skeleton positions for non-stroke based features using the existing determined skeleton positions from step 1402. This step is important as not all features correspond to stroke features. For example, stroke ends are not stroke features and therefore do have a stroke width.

When the edges are analysed, edges are treated as part of a stroke when during the measurement of the edge width, as described hereinbefore with reference to FIG. 7, the normal projection from the point intersects another edge with a similar angle as the original edge. When this occurs, only when edges that are near parallel are found that such edges are marked as part of a stroke and the determined width is associated with the edges.

Figure 15A:
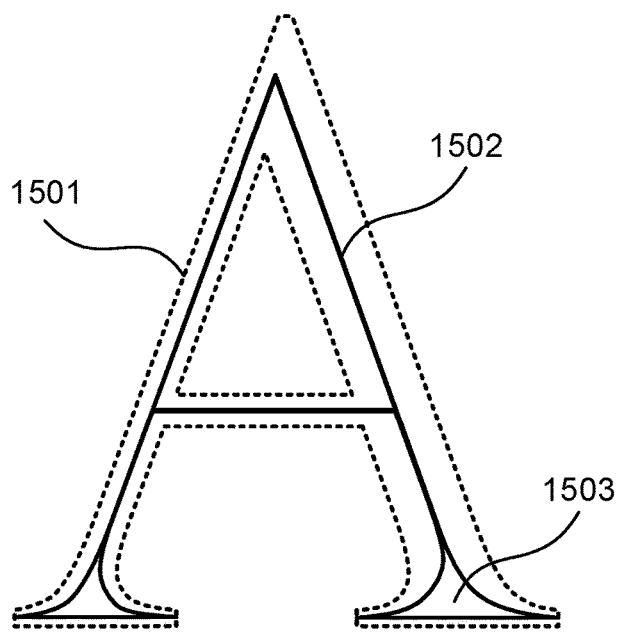
FIGS. 15A and 15B are block diagrams illustrating a complex example with serifs and the generated skeleton involving skeleton interpolation for non-stroke edges.

FIG. 15 illustrates an example of the interpolation of the skeleton positions. Given the example uppercase 'A' character in a serif typeface shown in FIG. 15A, the ideal skeleton for the outline 1501 for emboldening purposes corresponds to that shown as 1502. The skeleton corresponding to the bottom serif feature connecting to the right stem 1503 features a "gap" in the skeleton, where the skeleton is not located in the middle of the outline path. This is an area where stroke identification fails and interpolation is performed to produce the desired skeleton.

Figure 15B:
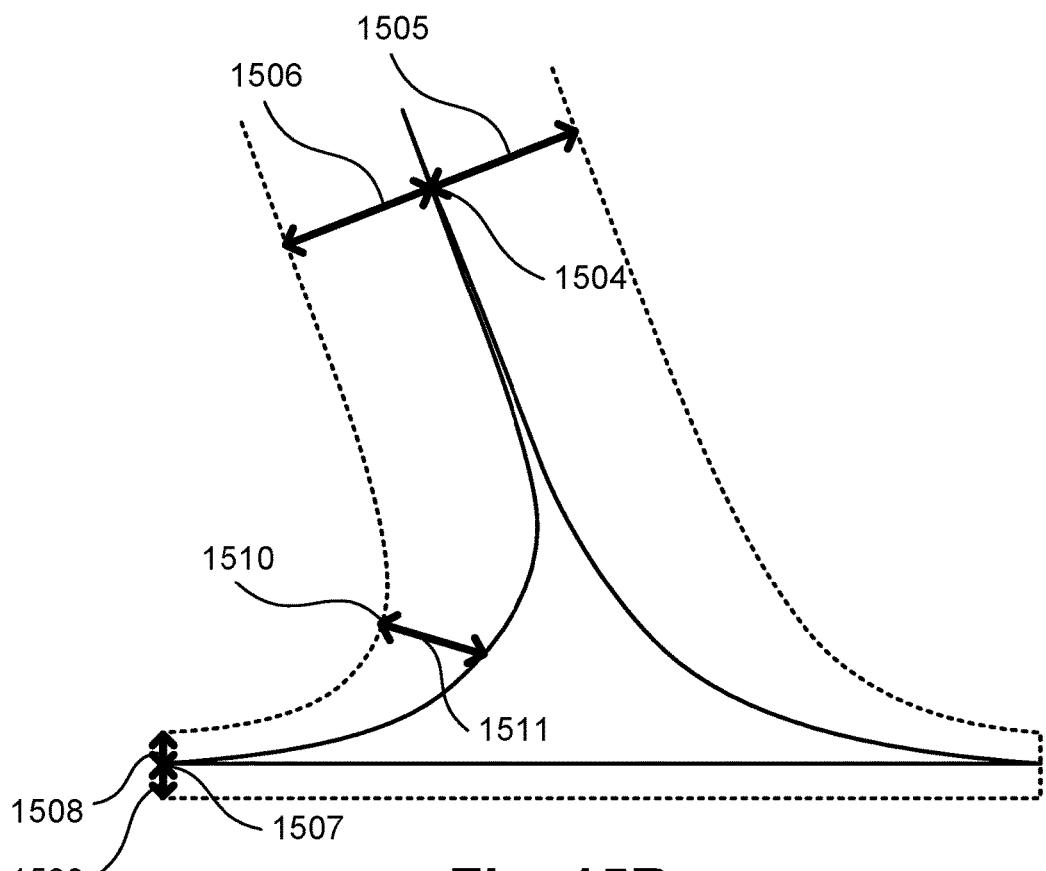

FIG. 15B illustrates in detail the feature 1506 to demonstrate the processing performed described hereinbefore in step 1403. For the main right-stem, the identification of the stroke is performed and produces a point 1504 located a distance 1505 from the right edge and located a distance 1506 from the left edge. The distances 1505 and 1506 are equal in length and therefore position the skeleton point 1504 equidistance from the edges. Similarly, a point 1507 located at distance of 1508 and 1509 is equidistance from the edges locates the skeleton path to be in the middle of the outline path. The determination of the distances is ideally measured in a direction orthogonal to the outline's edges. Now considering a point on the curved serif part 1510, which does not have an opposite edge which is orientated at an angle parallel to the tangent, no suitable distance measurement is available. When points are encountered with no stroke width measurement, the skeleton points need to be synthesised using other information. The synthesising may be performed by using the neighbouring determined widths 1506 and 1508 and interpolating to produce a suitable distance 1511. The interpolation is preferably performed by considering the angle of the measured widths and the length of the measurements.

Figure 16A:
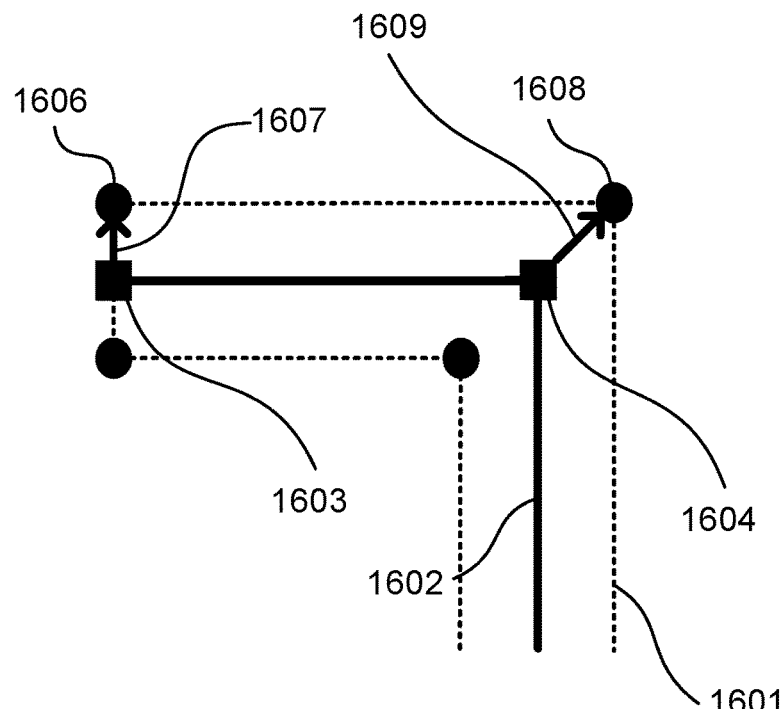
FIGS. 16A and 16B are block diagrams illustrating an example of emboldening using a skeleton structure to calculate points.

Once a suitable skeleton is generated, the translation step of the vertices is performed using the generated skeleton. FIG. 16 illustrates an example where emboldening is performed using the skeleton. FIG. 16A shows an example outline 1601 with its generated skeleton 1602. The skeleton control points 1603 and 1604 have been determined using the method 1400. The projection vectors are produced for each control point for the outline. For point 1606, the projection vector 1607 is determined using the skeleton point 1604 and outline point 1606. Similarly for point 1608, the projection vector 1609 is determined using the skeleton point 1604 and outline point 1608. Once the project vectors are determined, the vertex transformation process may proceed.

Figure 16B:
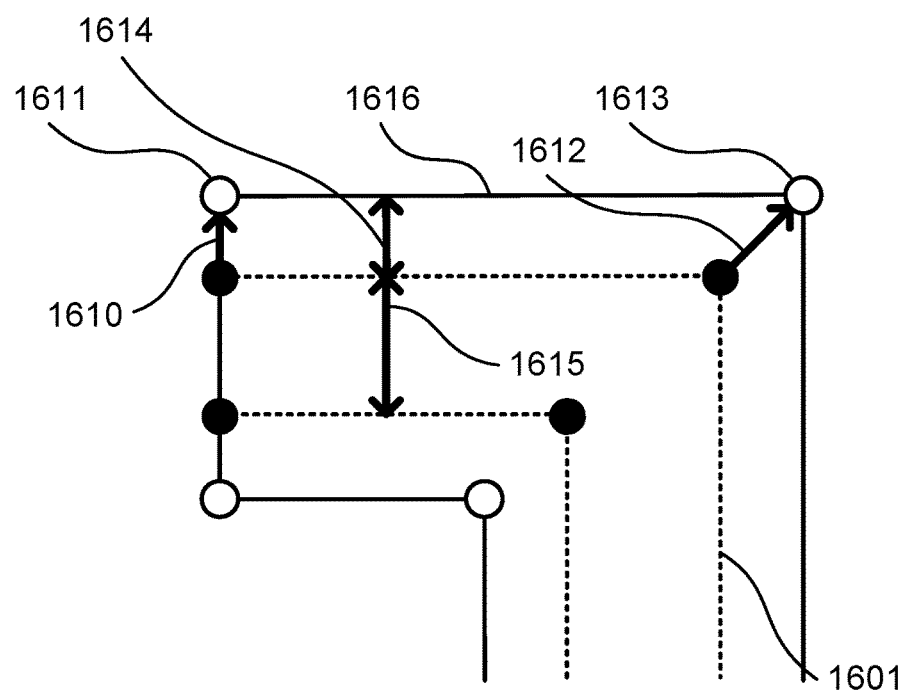

FIG. 16B shows the same character outline 1601 of FIG. 16A, but subjected to the emboldening process. The projection vector 1607 is multiplied by the emboldening parameter to produce the transformation vertex 1610. The process of multiplying by the emboldening parameter adjusts the emboldening amount. As the emboldening parameter is a scalar quantity, the multiplication process adjusts the magnitude of the vector quantity but preserves the direction. The transformation vertex 1610 is used to transform the original control point 1604 to produce the adjusted emboldened control point 1611. Similarly, the projection vector 1609 is multiplied by the emboldening parameter to produce the transformation vertex 1612 and is used to adjust point 1608 to produce emboldened control point 1613. Once all the vertices have been processed, an emboldened outline 1616 is produced which offset each edge at a distance away from the original outline proportional to the width of each stroke. For example, the distance 1614 is proportional to the stroke width 1615 and the emboldening parameter.

INDUSTRIAL APPLICABILITY

The arrangements described are applicable to the computer and data processing industries and particularly for computer fonts represented in a scalable vector representation of an outline. Such computer fonts, including an emboldened representation of an initial character, can be rendered using a display or printer device.

Methods, apparatuses, and computer readable storage mediums for increasing the weight of a character have been described. The foregoing describes only some embodiments of the present invention, and modifications and/or changes can be made thereto without departing from the scope and spirit of the invention, the embodiments being illustrative and not restrictive.

The invention claimed is:

1. A method of increasing the weight of a character, the method comprising:
   receiving a vector character description and an emboldening parameter of an initial character;
   calculating direction and distance to transform vertices of the initial character using stroke widths; and
   forming an emboldened representation of the initial character by moving each vertex of the initial character based on a combination of the emboldening parameter, the calculated direction and distance, and a stroke width for each edge associated with the vertex, such that each stroke of the emboldened representation of the initial character is thickened proportionally to the width of the stroke to increase the weight of the initial character.

2. The method as claimed in claim 1, wherein said emboldening parameter is a numeric value, of a data type supporting fractional values and negative values.

3. The method as claimed in claim 1, further comprising:
   determining strokes in the vector character description and stroke widths; and
   calculating directions and distances to transform vertices of a character outline of the vector character description of the initial character using said determined stroke widths.

4. The method as claimed in claim 3, wherein the emboldened representation of the initial character is formed by translating vertices by the calculated direction, calculated distance, and emboldening parameter.

5. The method as claimed in claim 4, wherein the emboldened representation of the initial character maintains the contrast of an original outline of the initial character.

6. The method as claimed in claim 3, wherein vertices are extracted from a vectorised form of a character outline.

7. The method as claimed in claim 1, further comprising rendering the emboldened representation of the initial character using a display or printer device.

8. A method of increasing the weight of a character, the method comprising:
   receiving a vector character description of an initial character;
   generating a skeleton structure for the vector character description of the initial character;
   determining vertex transformation vectors using outline control points and said generated skeleton structures;
   determining vertex direction and distance using said generated skeleton structure to transform said determined vertex transformation vectors; and
   forming an emboldened representation of the initial character by transforming each vertex using said determined vertex transformation vectors, wherein said vertex transformation vectors for an edge of the character are a function of a stroke width of the edge of the character.

9. The method as claimed in claim 8, wherein vertex transformation distances and directions of the vertex transformation vectors are determined using said generated skeleton structure and said original outline.

10. The method as claimed in claim 8, wherein the generating step comprises:
    identifying strokes in the vector character description;
    determining control point positions for the strokes of the skeleton structure; and
    interpolating skeleton positions for non-stroke based features using the determined control point positions of the skeleton structure.

11. The method as claimed in claim 8, further comprising rendering the emboldened representation of the initial character using a display or printer device.

12. An apparatus for increasing the weight of a character, comprising:
    a memory for storing data and a computer program; and
    a processor unit coupled to the memory for executing a computer program, said memory and said processor configured to interface with a rendering device, the computer program comprising:
      computer program code for receiving a vector character description and an emboldening parameter of an initial character;
      computer program code for calculating direction and distance to transform vertices of the initial character using stroke widths; and
      computer program code for forming an emboldened representation of the initial character by moving each vertex of the initial character based on a combination of the emboldening parameter, the calculated distance and direction, and a stroke width for each edge associated with the vertex, such that each stroke of the emboldened representation of the initial character is thickened proportionally to the width of the stroke to increase the weight of the initial character.

13. The apparatus as claimed in claim 12, further comprising a display or printer device for rendering the emboldened representation of the initial character.

14. An apparatus for increasing the weight of a character, comprising:
    a memory for storing data and a computer program; and
    a processor unit coupled to the memory for executing a computer program, said memory and said processor configured to interface with a rendering device, the computer program comprising:

computer program code for receiving a vector character description of an initial character;

computer program code for generating a skeleton structure for the vector character description of the initial character;

computer program code for determining vertex transformation vectors using outline control points and said generated skeleton structure;

computer program code for determining vertex direction and distance using said generated skeleton structure to transform said determined vertex transformation vectors; and computer program code for forming an emboldened representation of the initial character by transforming each vertex using said determined vertex transformation vectors, wherein said vertex transformation vectors for an edge of the character are a function of a stroke width of the edge of the character.

15. The apparatus as claimed in claim 14, further comprising a display or printer device for rendering the emboldened representation of the initial character.

16. A non-transitory computer readable storage medium having recorded therein a computer program for increasing the weight of a character, the computer program comprising:

computer program code for receiving a vector character description and an emboldening parameter of an initial character;

computer program code for calculating direction and distance to transform vertices of the initial character using stroke widths;

computer program code for forming an emboldened representation of the initial character by moving each vertex of the initial character based on a combination of the emboldening parameter, the calculated direction and distance, and a stroke width for each edge associated with the vertex, such that each stroke of the emboldened representation of the initial character is thickened proportionally to the width of the stroke to increase the weight of the initial character.

17. A non-transitory computer readable storage medium having recorded therein a computer program for increasing the weight of a character, the computer program comprising:

computer program code for receiving a vector character description of an initial character;

computer program code for generating a skeleton structure for the vector character description of the initial character;

computer program code for determining vertex transformation vectors using outline control points and said generated skeleton structure;

computer program code for determining vertex direction and distance using said generated skeleton structure to transform said determined vertex transformation vectors; and computer program code for forming an emboldened representation of the initial character by transforming each vertex using said determined vertex transformation vectors, wherein said vertex transformation vectors for an edge of the character are a function of a stroke width of the edge of the character.

* * * * *